US010649558B2

(12) United States Patent
Zheng et al.

(10) Patent No.: US 10,649,558 B2
(45) Date of Patent: May 12, 2020

(54) TOUCH PANEL AND MANUFACTURING METHOD THEREOF, TOUCH DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Qitao Zheng, Beijing (CN); Ming Hu, Beijing (CN); Ming Zhang, Beijing (CN); Shifeng Xu, Beijing (CN); Yu Zhu, Beijing (CN); Xinbin Tian, Beijing (CN); Chunjian Liu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 196 days.

(21) Appl. No.: 15/558,747

(22) PCT Filed: Feb. 16, 2017

(86) PCT No.: PCT/CN2017/073784
§ 371 (c)(1),
(2) Date: Sep. 15, 2017

(87) PCT Pub. No.: WO2017/202069
PCT Pub. Date: Nov. 30, 2017

(65) Prior Publication Data
US 2018/0181226 A1 Jun. 28, 2018

(30) Foreign Application Priority Data

May 25, 2016 (CN) .......................... 2016 1 0355428

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01)

(58) Field of Classification Search
CPC ................................ G06F 3/041–3/047; G06F 2203/041–2203/04114
See application file for complete search history.

(56) References Cited

U.S. PATENT DOCUMENTS

2009/0256820 A1* 10/2009 Yanase .................. G06F 3/0412
345/174
2012/0175235 A1* 7/2012 Jiang ....................... G06F 3/044
200/600

(Continued)

FOREIGN PATENT DOCUMENTS

CN 103376939 A 10/2013
CN 104182104 A 12/2014
(Continued)

OTHER PUBLICATIONS

Search Report for International Patent Application No. PCT/CN2017/073784 dated May 15, 2016.

(Continued)

*Primary Examiner* — Roberto W Flores
(74) *Attorney, Agent, or Firm* — Calfee, Halter & Griswold LLP

(57) ABSTRACT

A touch panel, a manufacturing method thereof and a touch device are disclosed, which belongs to the field of manufacturing touch panel. The touch panel includes a substrate, a black matrix in an annular area at edges of the substrate and a transparent conductive pattern. The transparent conductive pattern has an overlapping region with the black matrix in the annular area. The transparent conductive (Continued)

pattern includes a plurality of lateral touch driving lines, a plurality of longitudinal touch sensing lines and a plurality of padding blocks. The plurality of Txs laterally disposed and the plurality of Rxs longitudinally disposed are insulated from each other. The distribution density of the padding blocks in the overlapping region is greater than the distribution density of the padding blocks in the view area.

19 Claims, 13 Drawing Sheets

(56) References Cited

U.S. PATENT DOCUMENTS

| | | | | |
|---|---|---|---|---|
| 2014/0085261 | A1* | 3/2014 | Lu | G06F 3/044 345/174 |
| 2014/0152915 | A1* | 6/2014 | Lu | G06F 3/044 349/12 |
| 2014/0293163 | A1* | 10/2014 | Ju | G06F 3/044 349/12 |
| 2014/0346027 | A1 | 11/2014 | Li et al. | |
| 2014/0347299 | A1* | 11/2014 | Lu | G06F 3/044 345/173 |
| 2014/0347319 | A1 | 11/2014 | Lin et al. | |
| 2015/0060253 | A1* | 3/2015 | Lin | G06F 3/044 200/5 R |
| 2015/0085205 | A1* | 3/2015 | Chen | G06F 3/044 349/12 |
| 2015/0109247 | A1* | 4/2015 | Chen | G06F 3/044 345/174 |
| 2016/0018348 | A1* | 1/2016 | Yau | G06F 3/044 324/697 |
| 2017/0185202 | A1 | 6/2017 | Qu | |

FOREIGN PATENT DOCUMENTS

| | | |
|---|---|---|
| CN | 204155245 U | 2/2015 |
| CN | 104635992 A | 5/2015 |
| CN | 205193753 U | 4/2016 |
| CN | 106055147 A | 10/2016 |
| CN | 205721706 U | 11/2016 |

OTHER PUBLICATIONS

Second Office Action for Chinese Patent Application No. 201610355428.7 dated Mar. 20, 2019.

First Office Action for Chinese Patent Application No. 201610355428.7 dated Jun. 4, 2018.

* cited by examiner

TOUCH PANEL AND MANUFACTURING METHOD THEREOF, TOUCH DEVICE

RELATED APPLICATION

The present application is the U.S. national phase entry of PCT/CN2017/073784, with an international filling date of Feb. 16, 2017, which claims the benefit of Chinese Patent Application No. 201610355428.7, filed on May 25, 2016, the entire disclosure of which is incorporated herein by reference.

FIELD OF THE INVENTION

The present disclosure relates to the field of manufacturing a touch panel, and particularly to a touch panel, a manufacturing method thereof, and a touch device.

BACKGROUND

The One Glass Solution (OGS) touch panel is a touch panel obtained by forming a black matrix (BM) and an indium tin oxide (ITO) pattern on a substrate (usually a protective glass) successively.

Since the material for BM contains carbon and thus has certain conductivity, the area where the BM is provided is more prone to electro-static discharge (ESD) than the view area of the touch panel, such that in the area where the BM is provided (referred to as BM area), the touch sensing line and the touch driving line in the ITO pattern are more likely to be short-circuited with other pattern units, thereby affecting the capacitance between the touch sensing line and the touch driving line, which in turn affects the touch effect of the touch panel.

SUMMARY

In order to alleviate or solve the problem that the prior art touch panel has poor touch effect, embodiments of the present invention provide a touch panel, a manufacturing method thereof, and a touch device.

In an aspect, an embodiment of the present invention provides a touch panel. The touch panel comprises a substrate, a black matrix located in an annular area at edges of the substrate, and a transparent conductive pattern, the transparent conductive pattern having an overlapping region with the black matrix in the annular area, the transparent conductive pattern comprising a plurality of lateral touch driving lines, a plurality of longitudinal touch sensing lines and a plurality of padding blocks. The touch driving lines and the touch sensing lines are insulated from each other, each padding block is an independent pattern unit in the transparent conductive pattern. A distribution density of padding blocks in the overlapping region is greater than a distribution density of padding blocks in a view area.

In some embodiments, the plurality of lateral touch driving lines and the plurality of longitudinal touch sensing lines form a plurality of cross structures, each cross structure and padding blocks located within padding areas at four corners of the cross structure constitute a touch unit. A distribution density of padding blocks in each padding area in the overlapping region is greater than a distribution density of padding blocks located in the view area.

In some embodiments, the gap width between any two adjacent pattern units in the overlapping region is greater than 30 μm.

In some embodiments, the gap width between any two adjacent pattern units in the overlapping region is 100 μm.

In some embodiments, the corners of any of the pattern units in the transparent conductive pattern are round corners.

In some embodiments, areas of the padding blocks in the overlapping region decrease sequentially from a padding block away from a master touch line to a padding block close to the master touch line, the master touch line being one of the touch driving lines and the touch sensing lines.

In some embodiments, the transparent conductive pattern is an axisymmetric pattern, and has two mutually perpendicular symmetric axes.

In some embodiments, the transparent conductive pattern further comprises a wing line which is a slave touch line extending from a master touch line in a direction different from that in which the master touch line is arranged, the master touch line being one of the touch driving lines and the touch sensing lines. Areas of the padding blocks in the overlapping region decrease sequentially from a padding block away from the wing line to a padding block close to the wing line.

In some embodiments, the plurality of padding blocks comprise a first padding block in the overlapping region adjacent to a first master touch line, the first master touch line being one of the plurality of touch driving lines and the plurality of touch sensing lines. A gap surrounding the first padding block includes a gap between the first padding block and the first master touch line, and a first gap and a second gap between the first padding block and adjacent padding blocks. The first gap extends in a direction parallel to a direction in which the first master touch line is arranged, the first gap extends from a boundary of the transparent conductive pattern a first distance into an inner boundary of the black matrix, the second gap extends in a direction parallel to the inner boundary of the black matrix, the first distance being equal to a gap width between pattern units in the view area.

In some embodiments, the transparent conductive pattern further comprises a wing line which is a slave touch line extending from a second master touch line in a direction different from that in which the second master touch line is arranged, the second master touch line being one of the plurality of touch driving lines and the plurality of touch sensing lines. The plurality of padding blocks comprise a second padding block in the overlapping region adjacent to both the second master touch line and the wing line, and a third padding block in the overlapping region not adjacent to the second master touch line but adjacent to the wing line. A gap surrounding the second padding block includes gaps between the second padding block and, the second master touch line and the wing line, and a third gap and a fourth gap between the second padding block and adjacent padding blocks. A gap surrounding the third padding block includes a gap between the third padding block and the wing line and a fifth gap between the third padding block and an adjacent padding block. The third gap extends in a direction parallel to a direction in which the second master touch line is arranged, the third gap extends from the wing line a second distance into the inner boundary of the black matrix, the fourth gap extends in a direction parallel to the inner boundary of the black matrix, the fifth gap extends in a direction parallel to a direction in which the wing line is arranged, the second distance being equal to the gap width between pattern units in the view area.

Another embodiment of the present invention provides a touch device comprising the touch panel according to any of the preceding embodiments of the present invention.

A further embodiment of the present invention provides a touch panel comprising a substrate, a black matrix located in an annular area at edges of the substrate, and a transparent conductive pattern. The transparent conductive pattern has an overlapping region with the black matrix in the annular area. The transparent conductive pattern comprising a plurality of lateral touch driving lines, a plurality of longitudinal touch sensing lines and a plurality of padding blocks. A plurality of Txs laterally disposed and a plurality of Rxs longitudinally disposed are insulated from each other, and each padding block is an independent pattern unit in the transparent conductive pattern. The gap width between any two adjacent pattern units in the overlapping region is greater than 30 μm.

In some embodiments, the gap width between any two adjacent pattern units in the overlapping region is 100 μm.

BRIEF DESCRIPTION OF THE DRAWINGS

In order to more clearly illustrate the technical solutions in the embodiments of the present invention, the drawings which need to be used for description of the embodiments are briefly described below. The drawings in the description below are merely some embodiments of the present invention, and other drawings may also be obtained by those ordinarily skilled in the art based on these drawings, without spending inventive efforts.

FIG. 1-2 is a schematic view of the touch panel according to FIG. 1-1 in which BM is not shaded;

FIG. 2 is a schematic view of a touch unit L1 whose entire area is located in the view area in FIG. 1-1;

DETAILED DESCRIPTION OF EMBODIMENTS

To make the objective, technical solutions and advantages of the present disclosure clearer, embodiments of the invention will be further described in detail below with reference to the accompanying drawings.

Figure 1:
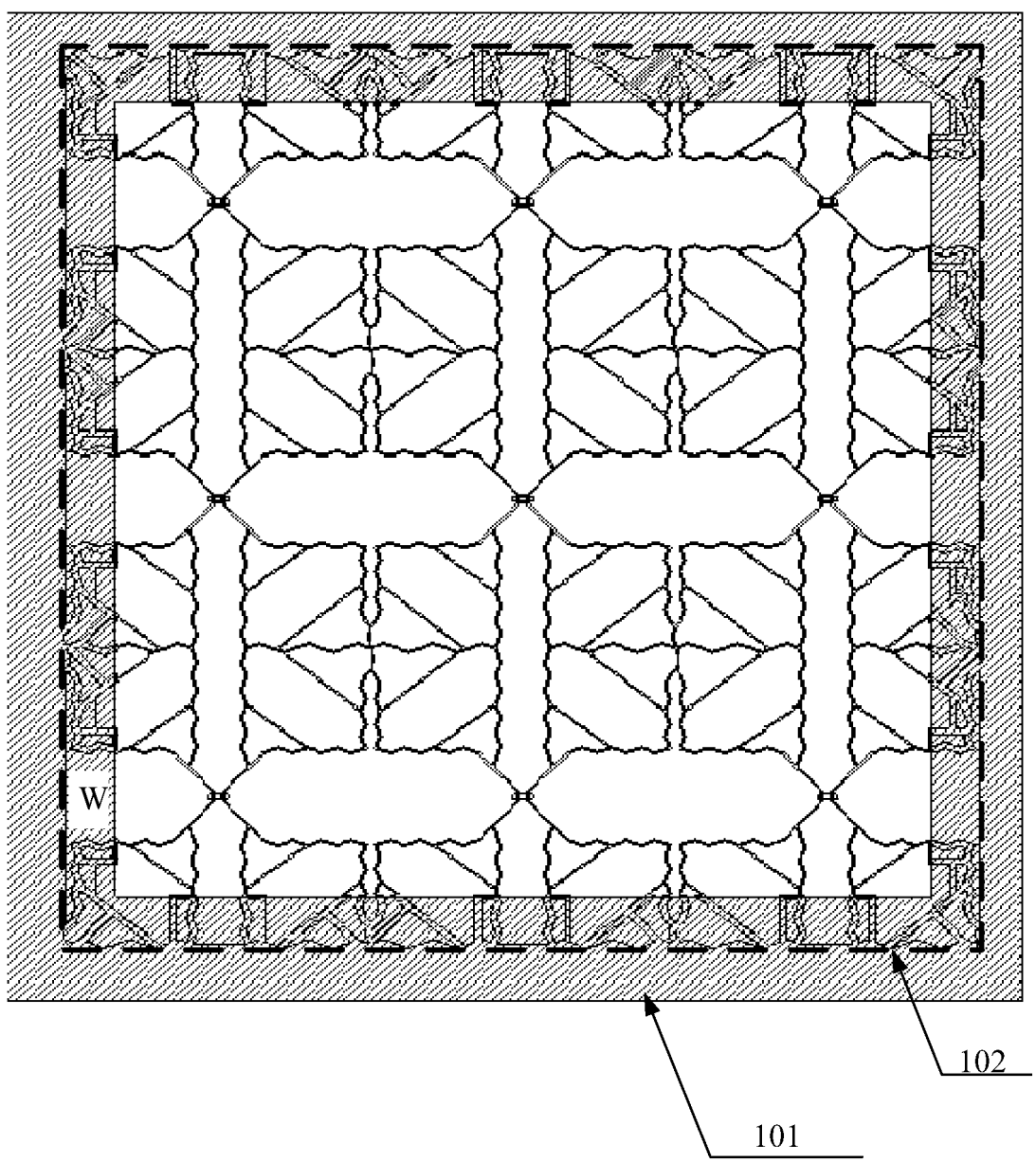
FIG. 1-1 is a schematic view of a touch panel provided by an embodiment of the present invention.
Figures 1, 2:
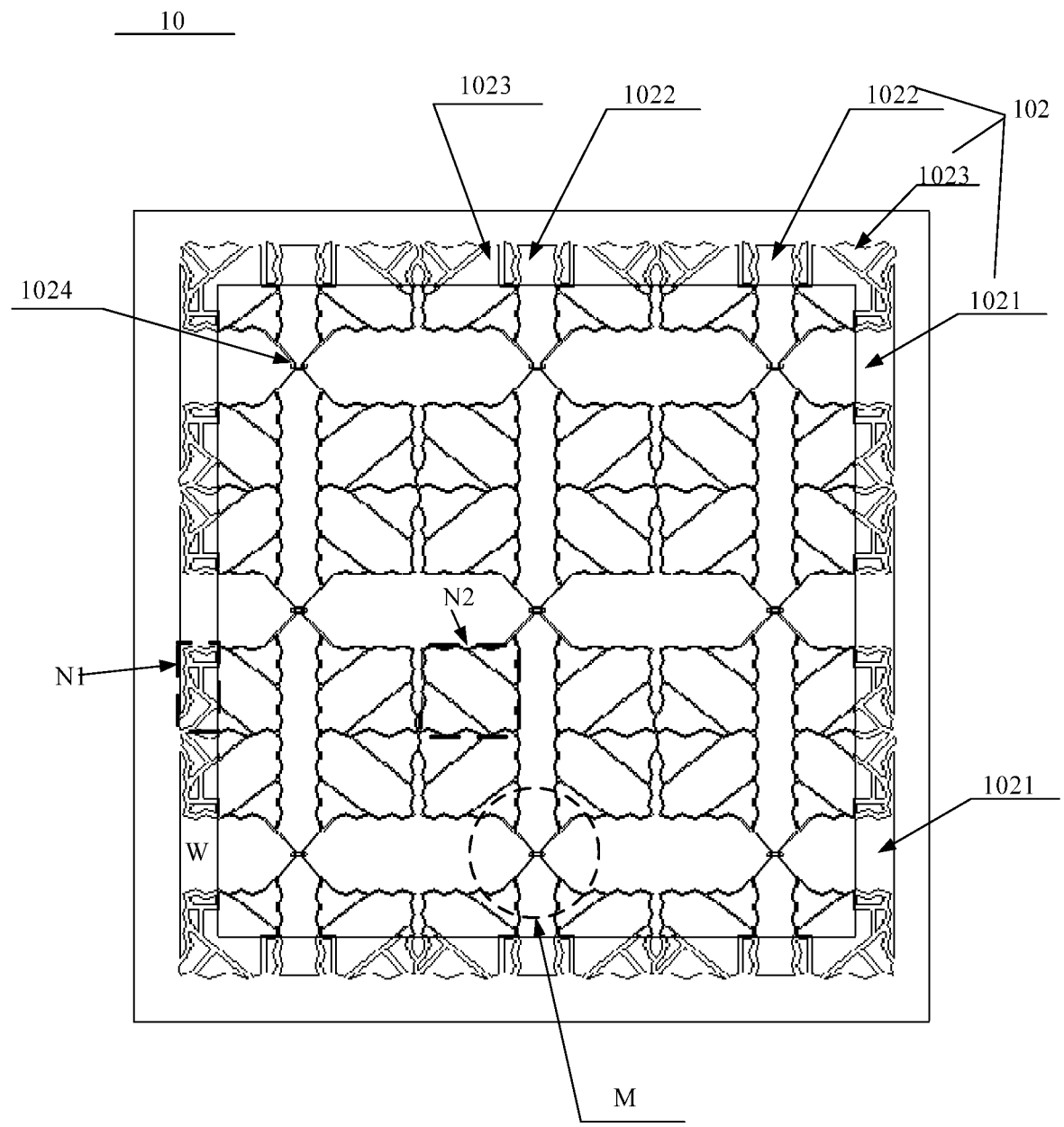
Figure 2:
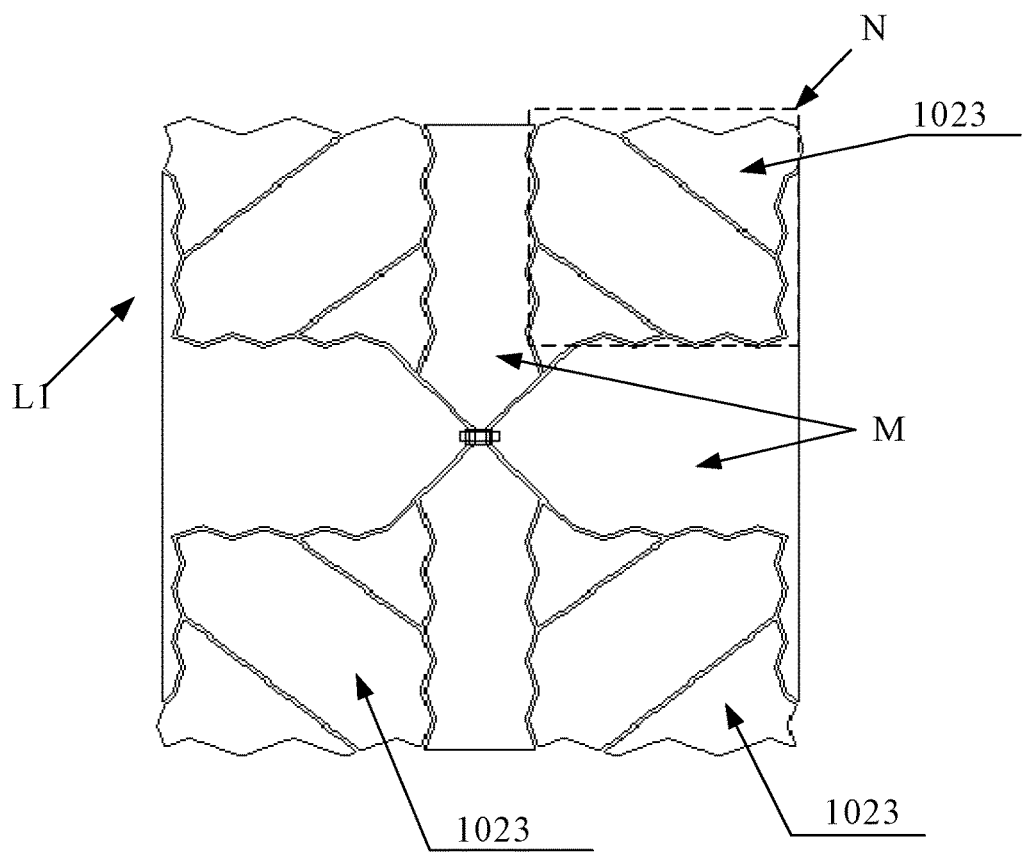
Figure 3:
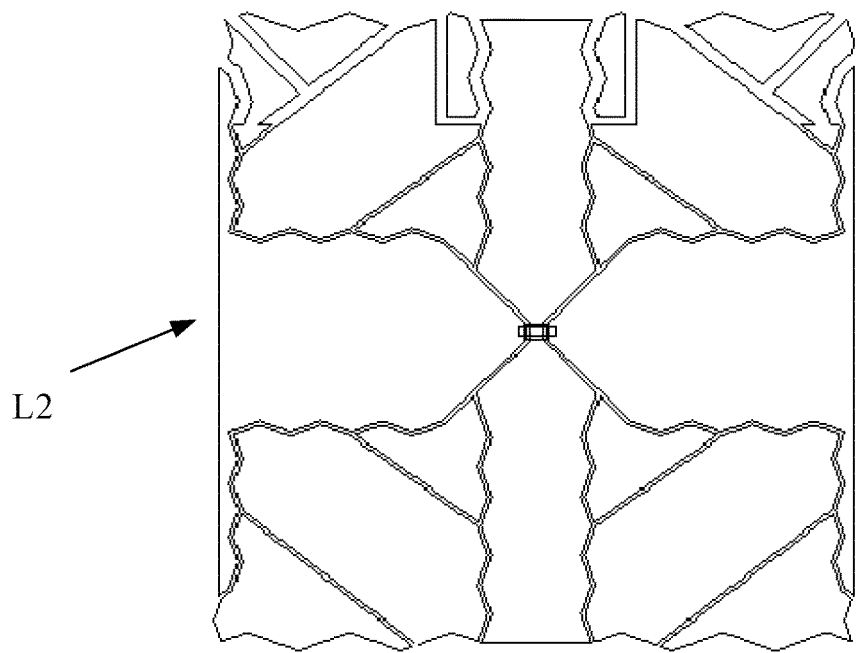
FIGS. 3 to 6 are schematic views of touch units L2, L3, L4 and L5 whose partial areas are located at the upper edge, the lower edge, the left edge and the right edge of the overlapping region shown in FIG. 1, respectively.
Figure 4:
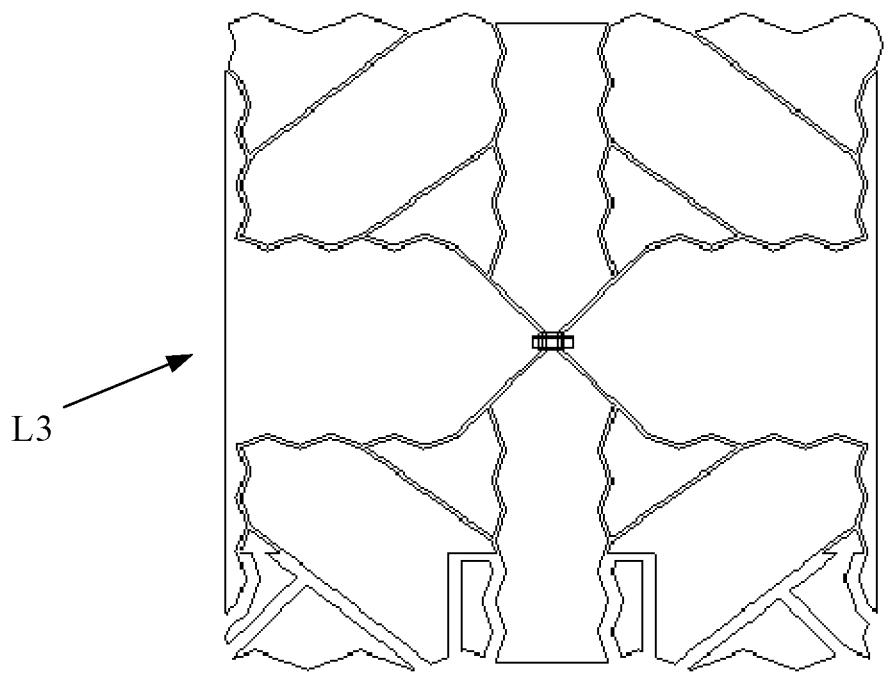
Figure 5:
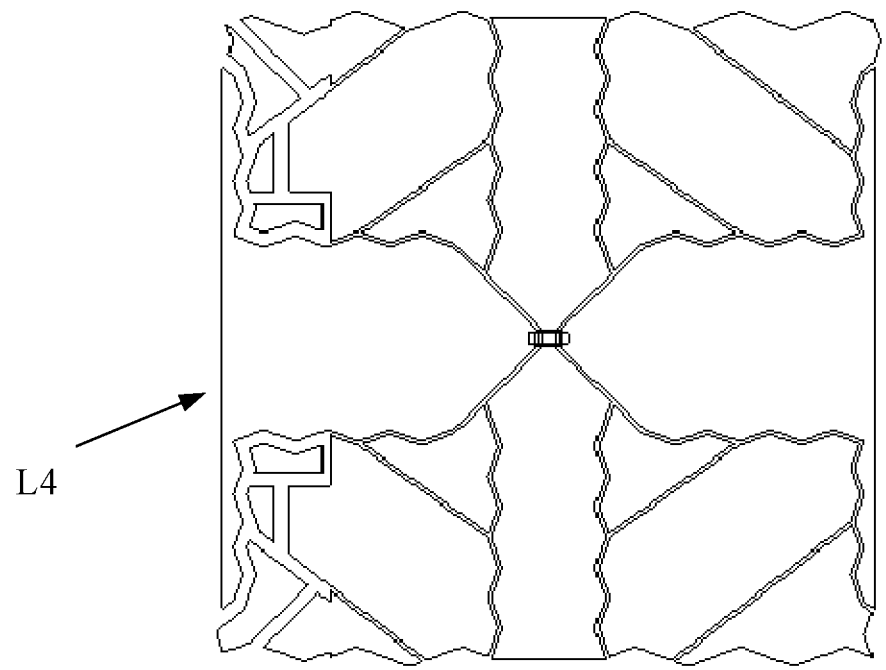
Figure 6:
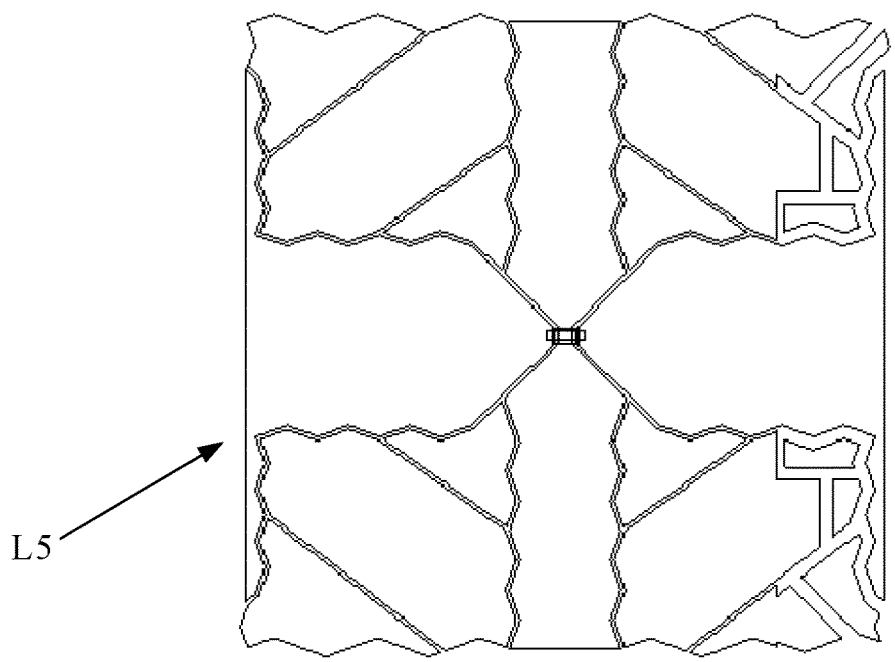
Figure 7:
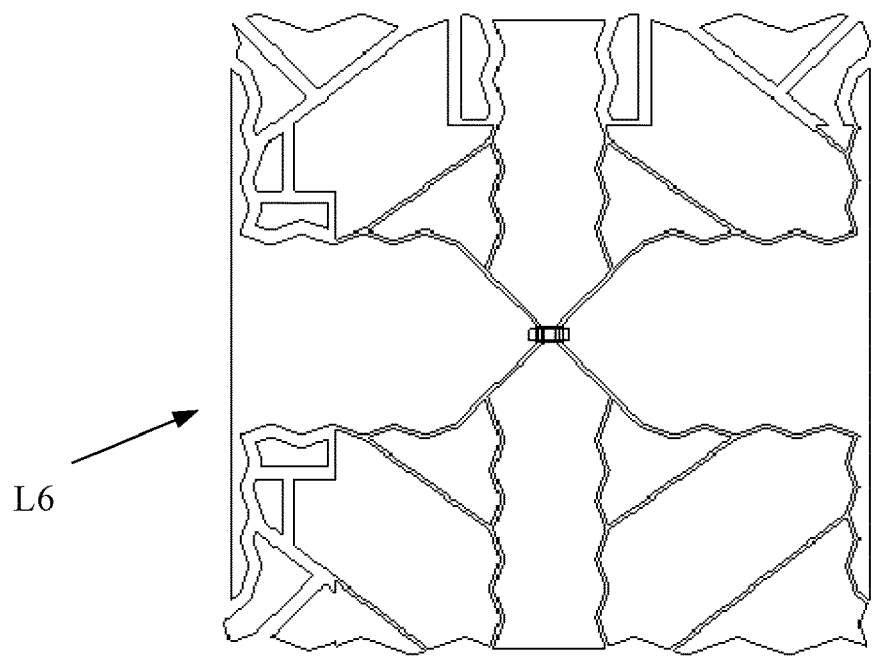
FIGS. 7 to 10 are schematic views of touch units L6, L7, L8 and L9 whose partial areas are located at the upper left corner, the upper right corner, the lower left corner and the lower right corner of the overlapping region shown in FIG. 1, respectively.
Figure 8:
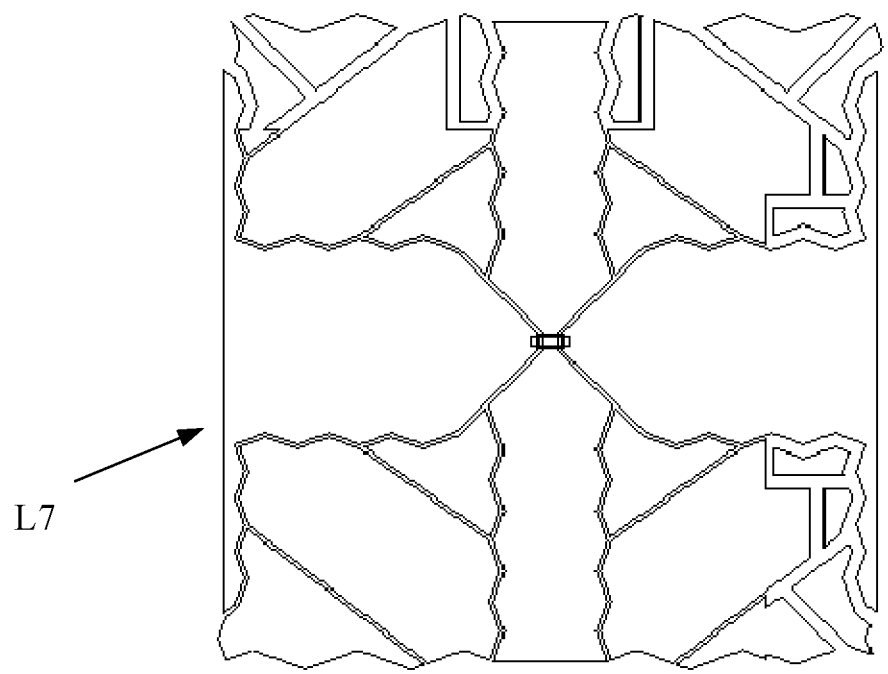
Figure 9:
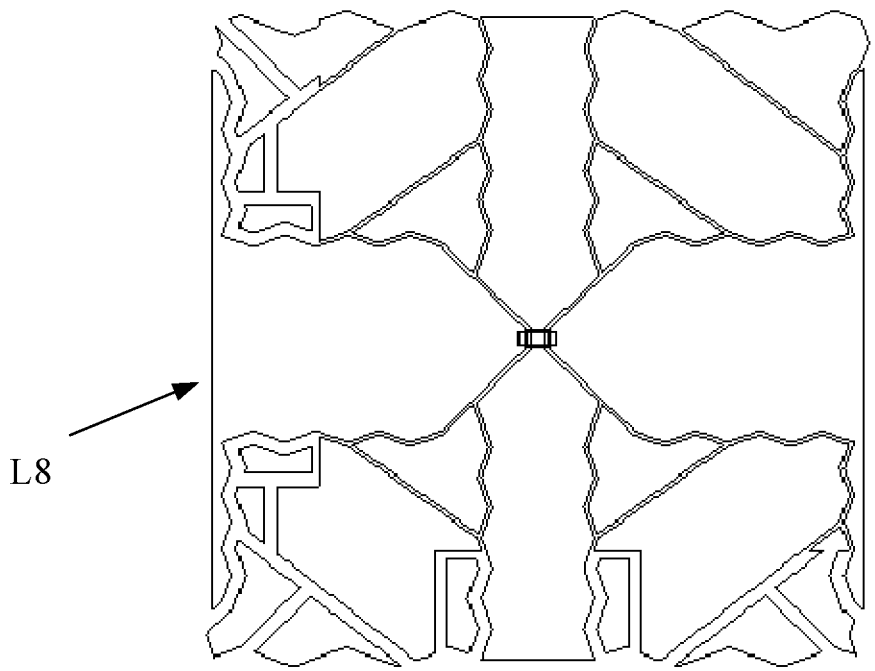

As shown in FIG. 1-1, which is a schematic view of a touch panel 10 provided by an embodiment of the invention. The touch panel 10 comprises a substrate (not shown in FIG. 1-1) which may be a transparent glass. A black matrix 101 is formed on the substrate, which is located in the annular area (the shaded area in FIG. 1-1) at edges of the substrate. A transparent conductive pattern 102 (the pattern in the dashed box in FIG. 1-1) is formed on the substrate on which the black matrix 101 is provided, and there is an overlapping region W between the transparent conductive pattern 102 and the black matrix in the annular area. To illustrate more clearly, as shown in FIG. 1-2 which is a schematic view of the touch panel according to FIG. 1-1 in which the black matrix is not shaded, the transparent conductive pattern 102 comprises a plurality of lateral touch driving lines 1021, a plurality of longitudinal touch sensing lines 1022, and a plurality of padding blocks 1023. The plurality of touch driving lines 1021 and the plurality of touch sensing lines 1022 are insulated from each other, and each padding block 1023 can form an independent pattern unit in the transparent conductive pattern. These multiple padding blocks may be used to adjust the mutual capacitance between the touch sensing line and the touch driving line so as to improve the optical effect of the view area of the touch panel.

In an embodiment of the present invention, the touch driving line 1021 and the touch sensing line 1022 may be formed in the same layer by one patterning process, which can be insulated from each other by a gap between them.

Further, the transparent conductive pattern 102 may further comprise a plurality of conductive bridges 1024 for electrically connecting multiple lateral touch driving lines.

The distribution density of the padding blocks in the overlapping region is greater than that of the padding blocks in the view area of the touch panel. In the embodiment of the present invention, the distribution density of padding blocks refers to the degree of crowdedness of padding blocks distributed in a unit area. The larger the number of padding blocks in a unit area is, the greater the distribution density thereof will be.

In conclusion, for the touch panel provided by the embodiment of the present invention, the distribution density of the padding blocks in the overlapping region in the transparent conductive pattern is greater than the distribution density of the padding blocks in the view area. Since the distribution density of the padding blocks in the overlapping region is greater, that is, the number of padding blocks in the overlapping region per unit area is larger, the area of each padding block in the overlapping region is relatively small. In the case where the touch driving line or the touch sensing line is short-circuited with the padding block, the impact on the mutual capacitance between the touch driving line and the touch sensing line is smaller due to the small area of the padding block in the black matrix area, thereby effectively reducing the influence on the touch effect of the touch panel.

Further, the plurality of lateral touch driving lines and the plurality of longitudinal touch sensing lines may form a plurality of cross structures M. As shown in FIG. 2, each cross structure M and a plurality of padding blocks 1023 located in padding areas N at four corners of the cross structure M (the padding area is similar to a rectangular area, which is schematically shown by the rectangular dashed box in FIG. 2) constitute a touch unit. The transparent conductive pattern 102 may be made of a tin indium oxide (ITO). In some embodiments, the transparent conductive pattern 102 is an axisymmetric pattern, and has two mutually perpendicular symmetric axes. As shown in FIG. 1-2, the transparent conductive pattern 102 is approximately rectangular, which can ensure the consistency of the optical performance of the touch panel.

As shown in FIG. 1-2, the distribution density of the padding blocks in the portion of padding areas which is located in the overlapping region is greater than the distribution density of the padding blocks in the view area. For example, in FIG. 1-2, the distribution density of the padding blocks in portion N1 of a padding area located in the overlapping region W is greater than the distribution density of the padding blocks in a padding area N2 located in the view area. In the embodiment of the present invention, the view area is namely an area on the transparent conductive pattern other than the overlapping region.

In practical applications, it is possible that part or all of a padding to area is located in the overlapping region. FIGS. 1-1 and 1-2 illustrate that part of a padding area is located in the overlapping region. Moreover, the numbers of the touch driving lines and the touch sensing lines in the transparent conductive pattern 102 are adaptively determined according to the size of the touch panel. FIGS. 1-1 and 1-2 just illustrate three touch is driving lines and three touch sensing lines by way of examples.

In an embodiment of the present invention, the padding blocks in the overlapping region are typically distributed according to the rule that the area of a padding block is positively correlated to the distance between the padding block and the master touch line, that is, the closer the padding block is to the master touch line, the smaller the area thereof is. The master touch line may be a touch driving line or a touch sensing line. In some embodiments, the areas of the padding blocks in the overlapping region decrease sequentially from the padding block away from the master touch line to the padding block close to the master touch line. Since the area of the padding block close to the master touch line is relatively small, when the master touch line is short-circuited with this padding block, the impact on the capacitance between the touch driving line and the touch sensing line is small, thereby effectively reducing the influence on the touch effect of the touch panel.

In some embodiments, there may be padding blocks of various irregular shapes in the transparent conductive pattern, thus, it cannot be definitely ensured that the areas of the padding blocks in the overlapping region decrease sequentially from the padding block away from the master touch line to the padding block close to the master touch line. Therefore, in this case, it is only required to ensure that the area of the padding block close to the touch line in the overlapping region is smaller than a predetermined area. The preset area is an area value that enables the impact on the capacitance between the touch driving line and the touch sensing line when the padding block is short-circuited with the touch line to be below a predetermined degree.

FIGS. 2 to 10 are schematic views showing the touch units provided by embodiments of the present invention. FIG. 2 is a schematic view of a touch unit L1 whose entire area is located in the view area in FIG. 1-1. It can be seen from FIG. 1-1 that the structures of the touch units whose entire areas are located in the view area are identical and are the same as the structure of the touch unit L1. FIGS. 3 to 6 are schematic views of touch units L2, L3, L4 and L5 whose partial areas are located at the upper edge, the lower edge, the left edge and the right edge of the overlapping region shown in FIG. 1, respectively. FIGS. 7-10 are schematic views of touch units L6, L7, L8 and L9 whose partial areas are located at the upper left corner, the upper right corner, the lower left corner and the lower right corner of the overlapping region shown in FIG. 1, respectively.

Figure 10:
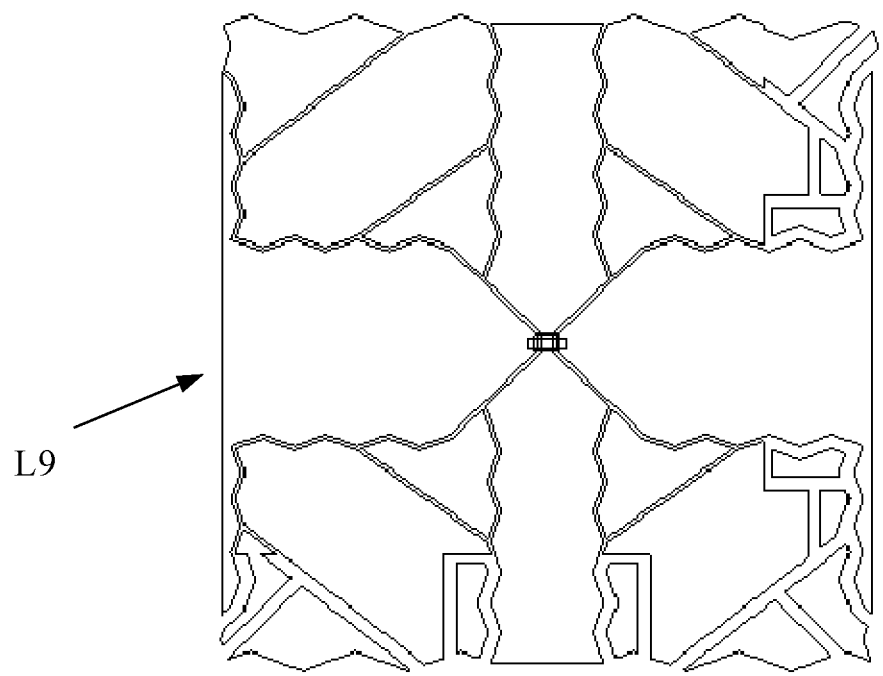

The transparent touch electrodes 102 are generally be classified into two types: a transparent touch electrode with a wing line and a transparent touch electrode without a wing line. The transparent touch electrodes 102 in FIGS. 1-1 to 10 are all transparent touch electrodes with a wing line. It can be seen from FIGS. 1-1 to 10 that the transparent touch electrode 102 in the embodiment of the present invention may further comprise a wing line. The wing line is a slave touch line that extends from a certain master touch line in a direction different from the extension direction of the certain master touch line. The certain master touch line is one of the touch driving lines and the touch sensing lines. The overall resistance of the transparent touch electrode 102 provided with wing lines is small and the engagement between the touch units is smoother.

Figure 11:
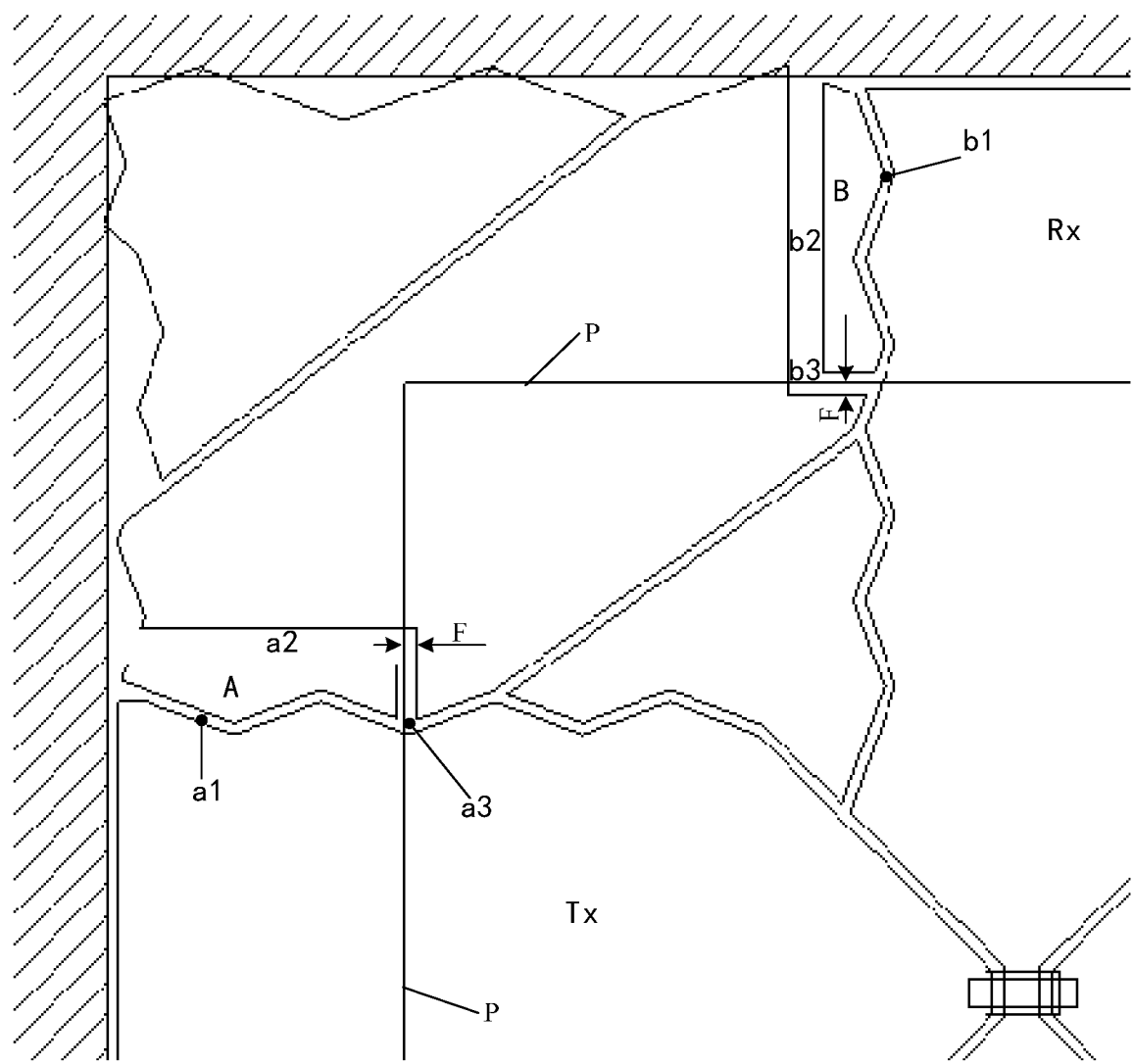
FIG. 11 is a partial schematic view of a touch unit of a transparent touch electrode without a wing line as provided by an embodiment of the present invention.

FIG. 11 is a partial schematic view of a touch unit of a transparent touch electrode without a wing line as provided by an embodiment of the invention. As shown in FIG. 11, the transparent conductive pattern of the touch panel comprises a first padding block in the overlapping region adjacent to a first master touch line, and the first master touch line is one of the touch driving lines and the touch sensing lines. The gap surrounding the first padding block includes a gap between the first padding block and the first master touch line, and a first gap and a second gap between the first padding block and adjacent padding blocks. The adjacent padding blocks may be one or more.

By way of example, it is assumed that in FIG. 11 the first master touch line is a touch driving line Tx, and the first padding block is denoted as A. The gap surrounding the first padding block A includes a gap $a1$ between the first padding block A and the first master touch line Tx, and a first gap $a2$ and a second gap $a3$ between the first padding block A and adjacent padding blocks.

By way of example, it is assumed that in FIG. 11 the first master touch line is a touch sensing line Rx, and the first padding block is indicated by B. The gap surrounding the first padding block B includes a gap $b1$ between the first padding block B and the first master touch line Rx, and a first gap $b2$ and a second gap $b3$ between the first padding block B and adjacent padding blocks.

The first gap extends in a direction parallel to the direction in which the first master touch line is arranged, and extends from the boundary of the transparent conductive pattern a first distance F into an inner boundary P of the black matrix. The second gap extends in a direction parallel to the inner boundary P of the black matrix. The first distance F is equal to the gap width between the pattern units in the view area, which is typically 30 μm. This ensures the optical uniformity of the view area and reduces the occurrence of ESD. The two sides of the second gap have certain distances from the inner boundary P of the black matrix, respectively, the distance between the side close to the boundary of the view area and the inner boundary P of the black matrix is the first distance F, and the distance between the other side and the inner boundary P of the black matrix may be 30 μm to 90 μm, preferably 30 μm.

Figure 12:
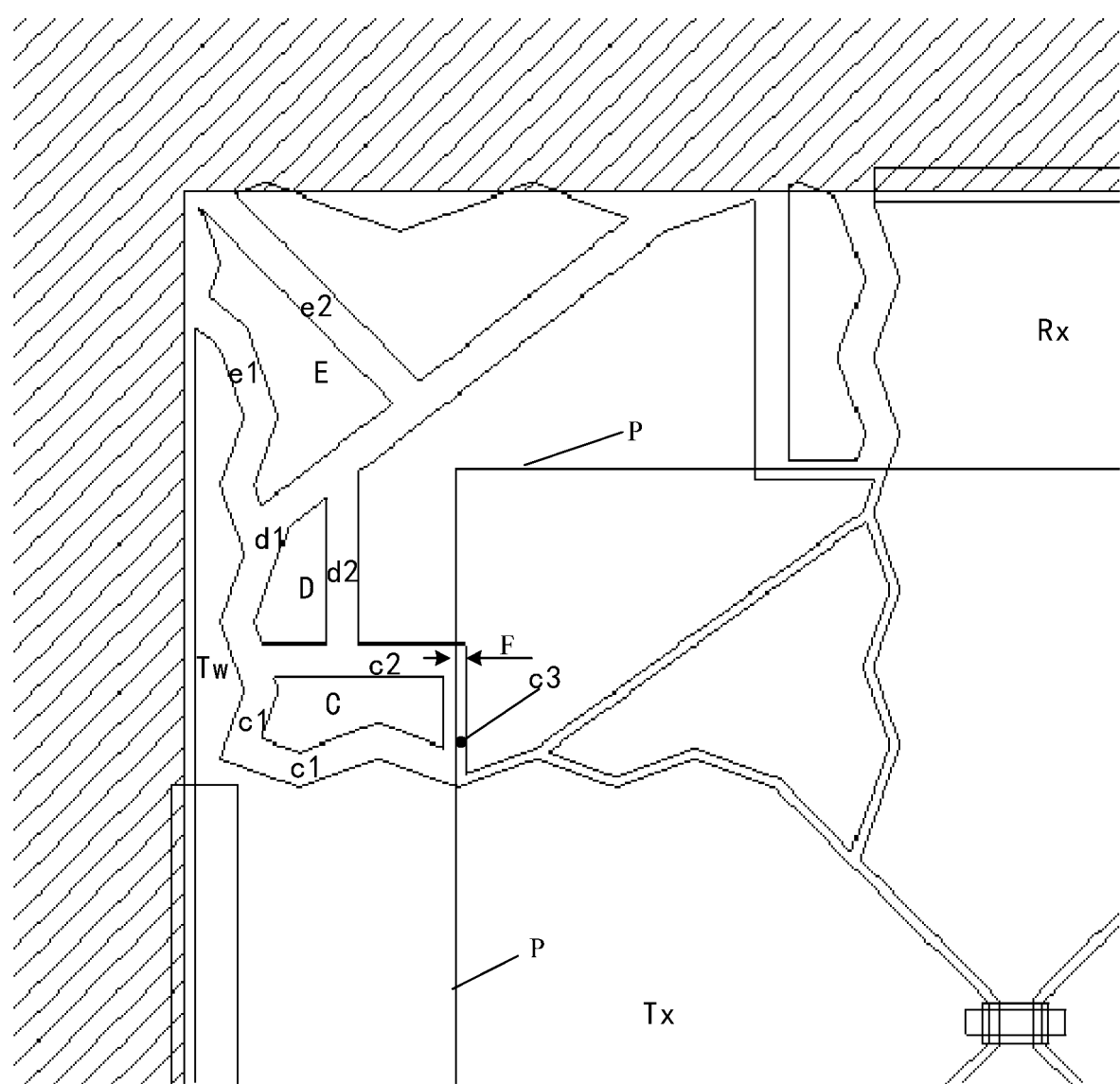
FIG. 12 is a partial schematic view of a touch unit of a transparent touch electrode with a wing line as provided by an embodiment of the present invention.

FIG. 12 is a partial schematic view of a touch unit of a transparent touch electrode with a wing line as provided by an embodiment of the invention. As shown in FIG. 12, the transparent conductive pattern further comprises a wing line Tw, which is a touch line extending from a second master touch line in a direction different from that in which the second master touch line is arranged. The second master touch line is one of the touch driving lines and the touch sensing lines.

The transparent conductive pattern may comprise a second padding block in the overlapping region which is adjacent to both the second master touch line and the wing line, and a third padding block in the overlapping region which is not adjacent to the second master touch line but adjacent to the wing line.

The gap surrounding the second padding block includes gaps between the second padding block and, the second master touch line and the wing line, and a third gap and a fourth gap between the second padding block and adjacent padding blocks. The gap surrounding the third padding block includes a gap between the third padding block and the wing line, and a fifth gap between the third padding block and an adjacent padding block.

For example, it is assumed that in FIG. 12 the second master touch line is a touch driving line Tx, the second padding block is indicated as C, the third padding block is indicated as D, and the wing line is indicated as Tw. The gap surrounding the second padding block C includes gaps c1 between the second padding block C and the second master touch line Tx and the wing line Tw, and a third gap c2 and a fourth gap c3 between the second padding block C and adjacent padding blocks. The gap surrounding the third padding block D includes a gap d1 between the third padding block D and the wing line Tw and a fifth gap d2 between the third padding block D and an adjacent padding block.

The third gap extends in a direction parallel to the direction in which the second master touch line Tx is disposed, and extends from the wing line a second distance F into an inner boundary P of the black matrix. The fourth gap extends in a direction parallel to the inner boundary of the black matrix and the fifth gap extends in a direction parallel to the direction in which the wing line is disposed. The second distance F is equal to the gap width between the pattern units in the view area, which is typically 30 μm. This ensures the optical uniformity of the view area and reduces the occurrence of ESD. The two sides of the fourth gap c3 have certain distances from the inner boundary P of the black matrix, respectively, the distance between the side close to the boundary of the view area and the inner boundary of the black matrix is the second distance F, and the distance between the other side and the inner boundary of the black matrix may be 30 μm to 90 μm, preferably 30 μm.

It is to be noted that, in some embodiments, the gap surrounding the third padding block D in the overlapping region which is not adjacent to the second master touch line but adjacent to the wing line may not include the gap parallel to the direction in which the wing line is disposed, as long as the third padding block D has a small area. For example, in FIG. 12, the third padding block may also be denoted as E, then there are a gap e1 between the third padding block E and the wing line Tw and a fifth gap e2 between the third padding block E and an adjacent padding block. The fifth gap e2 is not parallel to the direction in which the wing line is disposed.

Further, in the touch unit of the transparent touch electrode with the wing line, if the padding block in some of the touch units is only adjacent to the touch driving line or the touch sensing line, the structure of the padding block may refer to the first padding block A as shown in FIG. 11, which will not be described in detail herein.

Forming the transparent conductive pattern with the pattern of padding blocks shown in FIGS. 11 and 12 can ensure that the area of the padding block adjacent to the master touch line is small, so that the impact on the capacitance between the touch driving line and the touch sensing line is below a predetermined degree. Moreover, such a transparent conductive pattern can be obtained by simply adjusting the shape of the light-transmitting portion or the light-tight portion of the mask plate in the patterning process, thus the manufacturing process is relatively simple.

Further, in some embodiments, in the presence of a wing line, the padding blocks in the overlapping region may be distributed according to the rule that the area of a padding block is positively correlated to the distance between the padding block and the wing line, that is, the closer the padding block is to the wing line, the smaller the area thereof is.

Figure 13:
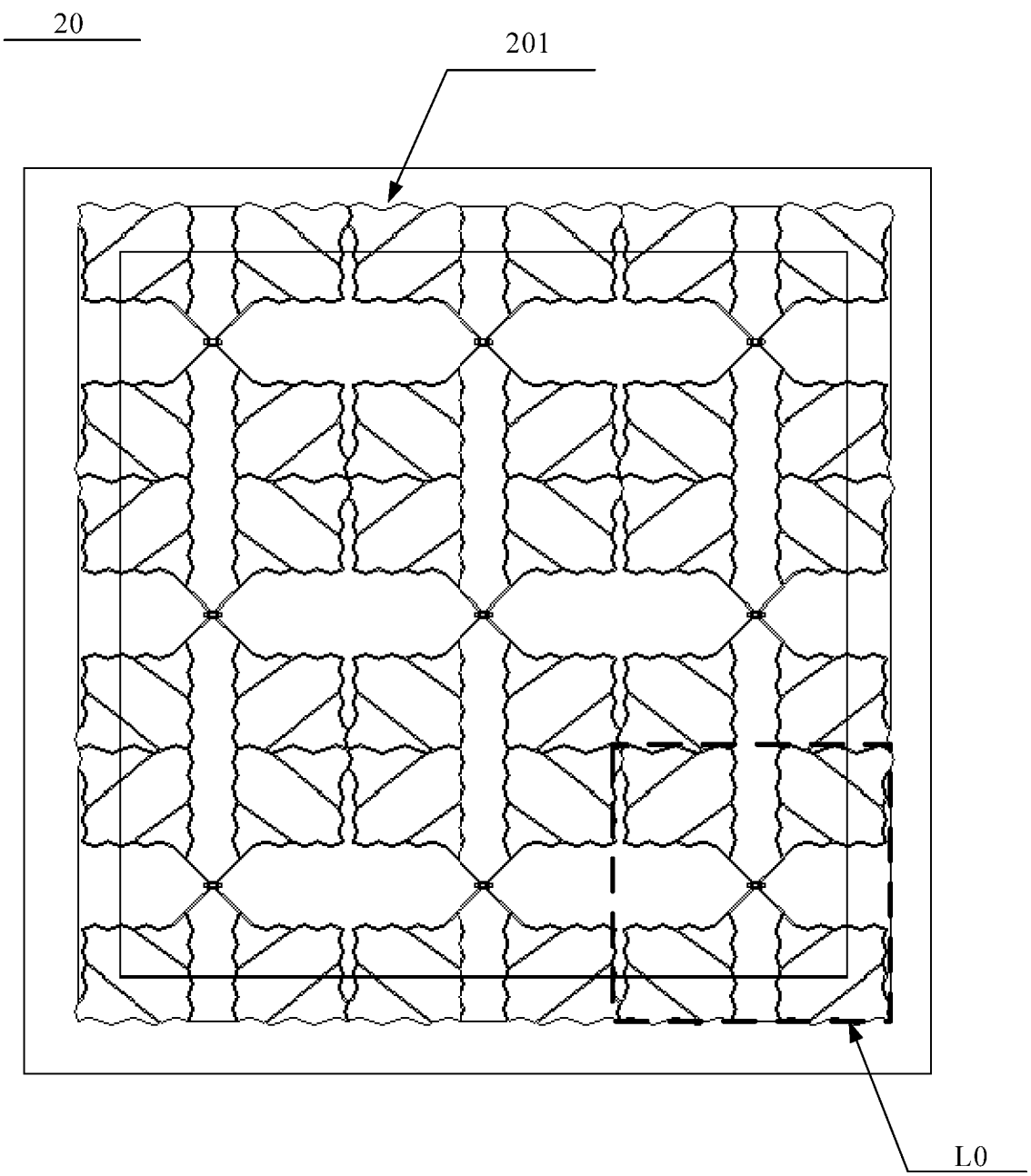
FIG. 13 is a schematic view of a conventional touch panel.

As shown in FIG. 13, which is a schematic view of a conventional touch panel 20 (for clarity of FIG. 13, the black matrix is not shaded), the touch panel 20 comprises: a substrate; a black matrix on the substrate, which is located in the annular area at edges of the substrate; a transparent conductive pattern 201 on the substrate on which the black matrix is formed. There is an overlapping region between the outer edge of the transparent conductive pattern 201 and the inner edge of the black matrix. The transparent conductive pattern 201 comprises a plurality of touch driving lines laterally disposed and a plurality of touch sensing lines longitudinally disposed, and a plurality of padding blocks. The plurality of touch driving lines and the plurality of touch sensing lines are insulated from each other, and form a plurality of cross structures. Each cross structure and a plurality of padding blocks located in the padding areas at four corners of the cross structure constitute a touch unit. The structure of each touch unit L0 in the transparent conductive pattern 201 is the same. In the related art, the touch unit is generally referred to as pixel. The transparent conductive pattern 201 of FIG. 13 is actually a pixel array formed by a plurality of identical pixels.

Therefore, by comparing the touch units provided in FIG. 1-1, 1-2 or 3 to FIG. 10 with the touch unit provided in FIG. 13, it can be clearly seen that in the touch panel 10 provided by the embodiments of the present invention, the distribution density of the padding blocks in the overlapping region between the black matrix and the transparent conductive pattern is significantly greater than the corresponding distribution density of the padding blocks in the conventional touch panel 20. That is, in a unit area, the number of padding blocks in the overlapping region is relatively large, and the area of each padding block is relatively small. When the touch driving line or the touch sensing line is short-circuited with the padding block, the impact on the capacitance between the touch driving line and the touch sensing line is small due to the small area of the padding block in the black matrix area, thereby effectively reducing the influence on the touch effect of the touch panel. Moreover, for the embodiment of the present invention, the structure of the padding block in the non-display area of the transparent conductive pattern is changed, which will not affect the display effect in the view area thereof.

In order to improve the optical effect of the view area, in the conventional touch panel 20, the gap width between adjacent pattern units in the view area is usually 30 μm (microns). To ensure the uniformity of the integral structure of the touch panel, the gap width between all the pattern units of the transparent conductive pattern is set as a fixed value, i.e. 30 μm. In the embodiments of the present invention, the pattern unit may be an independent pattern of the transparent conductive pattern, such as a padding block, a touch driving line, or the like.

However, the inventors have confirmed, after a lot of experiments, that the larger the gap width between two adjacent pattern units in the overlapping region between the transparent conductive pattern and the black matrix is, the lower the probability of short-circuiting is. Therefore, in an embodiment of the present invention, the gap width between any two adjacent pattern units in the overlapping region may be greater than 30 μm. This will effectively reduce the probability of short-circuiting in the overlapping region.

Figure 14:
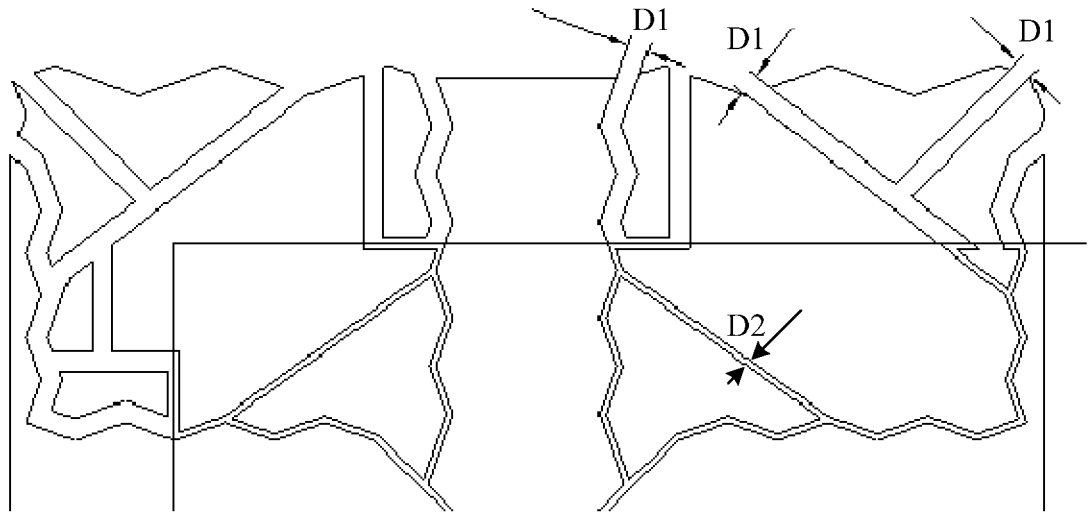
FIG. 14 is a schematic view showing part of a touch panel provided by an embodiment of the present invention.

However, when the gap width between the pattern units in the black matrix area increases, the node capacitance for a single touch unit increases. When the gap width is too large (for example, greater than 100 μm), the node capacitance increases too much. As a result, the node capacitance in the black matrix area is generally much larger than the node capacitance in the view area, resulting in poor uniformity of the transparent conductive pattern, and affecting the touch performance for the edge area of the touch panel. The upper limit of the gap width that can be supported by a driving integrated circuit (IC) chip respectively connected to the touch driving line and the touch sensing line is usually 100 μm (that is, when the gap width is within 100 μm, the node capacitance can be accepted by the driving IC chip, and the impact on the touch performance for the edge area of the touch panel is not significant at that time). In order to ensure the effective driving by the driving IC chip, in some embodiments, as shown in FIG. 14, in the touch panel 10 provided by the embodiment of the present invention, the gap width D1 between any two adjacent pattern units in the overlapping region is 100 μm. The gap width D2 in the view area can still be 30 μm.

In addition, when charges accumulate on the surface of a conductor, the charge density is related to the shape of the surface of the conductor, and the charge density is small at the gentle portion and has a largest value at the tip portion. Thus, the tip of the conductor easily gathers the charges. When the charge density reaches a certain magnitude, the electric field generated by the charges would be very strong, and the tip discharge phenomenon is likely to occur.

In the embodiment of the present invention, in order to avoid or reduce the occurrence of the tip discharge phenomenon, the corners of any of the pattern units in the transparent conductive pattern are round corners. The round corner has a small curvature relative to a sharp acute angle, which enables a smooth transition, can reduce charge accumulation, and avoids the occurrence of the tip discharge phenomenon.

In conclusion, for the touch panel provided by the embodiment of the present invention, the distribution density of the padding blocks in the overlapping region in the transparent conductive pattern is greater than the distribution density of the padding blocks in the view area. Since the distribution density of the padding blocks in the overlapping region W is greater, that is, the number of padding blocks in the overlapping region per unit area is larger, the area of each padding block in the overlapping region is relatively small. In the case where the touch driving line or the touch sensing line is short-circuited with the padding block, the impact on the capacitance between the touch driving line and the touch sensing line is small due to the small area of the padding block in the black matrix area, thereby effectively reducing the influence on the touch effect of the touch panel.

Figure 15:
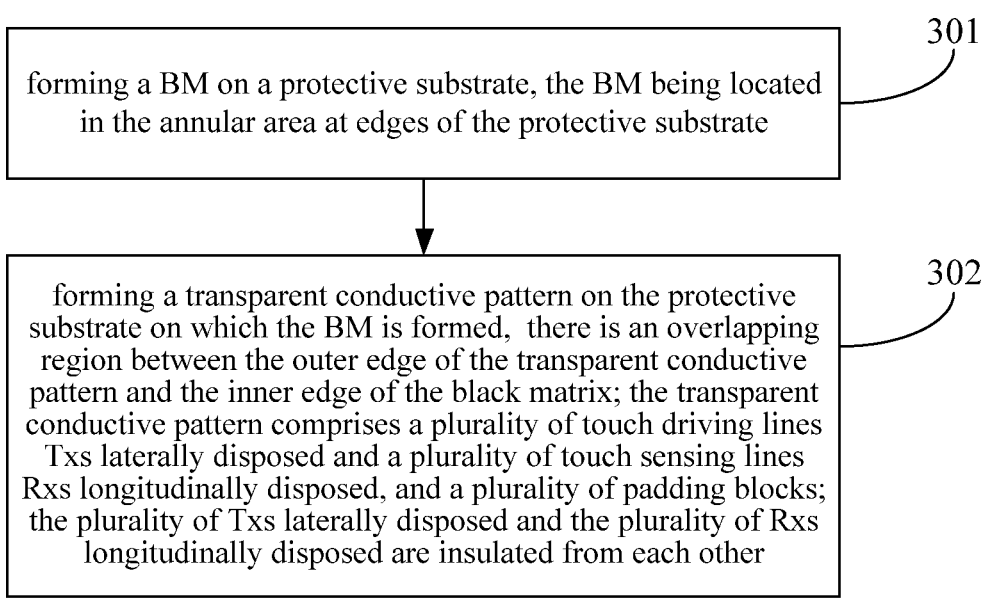
FIG. 15 is a flow chart showing a manufacturing method of a touch panel as provided by an embodiment of the present invention.

Another embodiment of the invention provides a manufacturing method for manufacturing a touch panel 10 provided by the above embodiment of the present invention. The manufacturing method comprises the steps as shown in FIG. 15:

In step 301, a black matrix is formed on the substrate, and the black matrix is located in the annular area at edges of the substrate.

Figure 16:
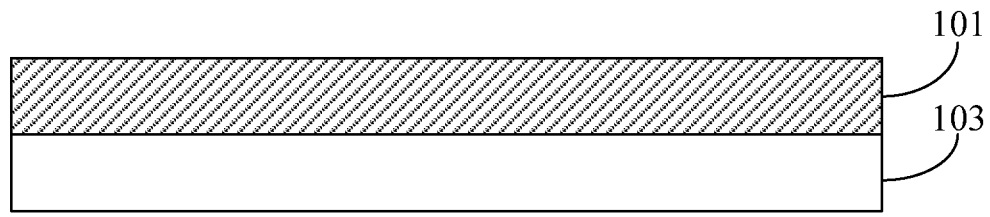
FIG. 16 is a sectional view of a substrate on which BM is formed as provided by an embodiment of the present invention.
Figure 17:
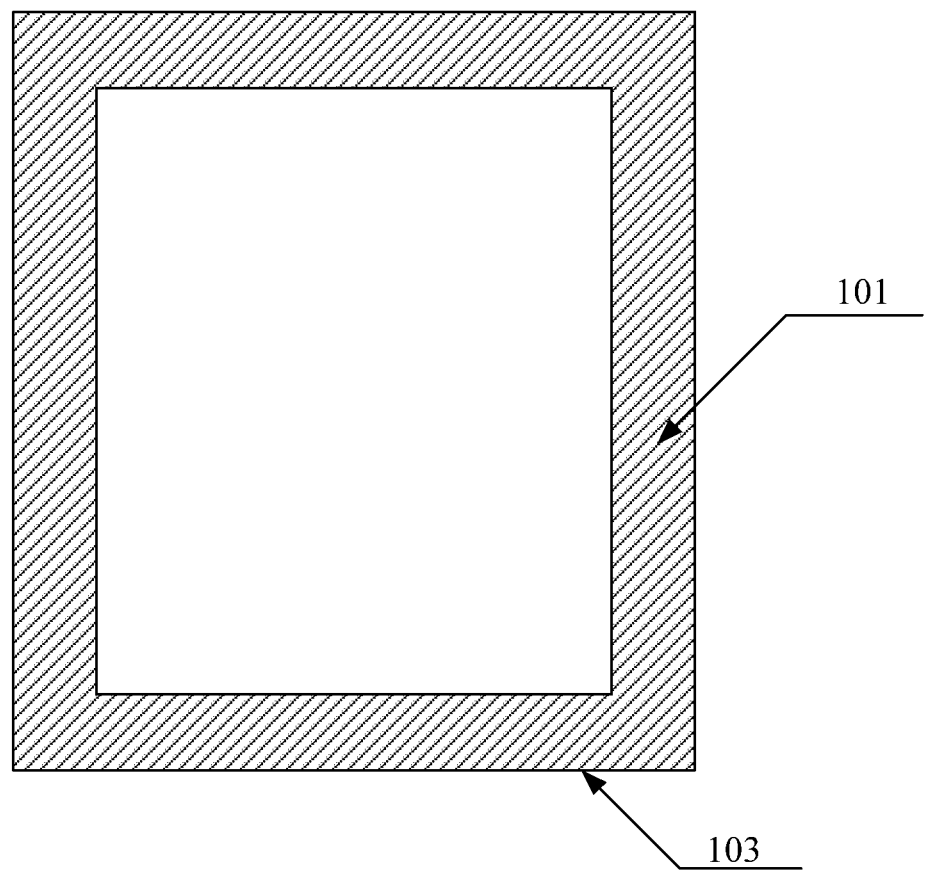
FIG. 17 is a top view of a substrate on which BM is formed as provided by an embodiment of the present invention.

As an example, a black matrix layer may be formed on the substrate by a deposition or coating process, and the black matrix layer may then be subjected to one patterning process to obtain a desired black matrix. The one patterning process may include photoresist coating, exposure, development, etching, photoresist stripping and the like. A sectional view of a substrate 103 on which a black matrix 101 is formed is shown in FIG. 16, and the top view thereof is shown in FIG. 17.

In step 302, a transparent conductive pattern is formed on the substrate on which the black matrix is formed. There is an overlapping region between the outer edge of the transparent conductive pattern and the inner edge of the black matrix. The transparent conductive pattern comprises a plurality of touch driving lines laterally disposed and a plurality of touch sensing lines longitudinally disposed, and a plurality of padding blocks. The plurality of touch driving lines and the plurality of touch sensing lines are insulated from each other.

By way of example, a transparent conductive layer may be formed on the substrate by a deposition or coating process, and the transparent conductive layer may then be subjected to one patterning process to obtain a transparent conductive pattern. The one patterning process may include photoresist coating, exposure, development, etching, photoresist stripping and the like.

Prior to step 302 or after step 302, the method may further comprise forming a plurality of conductive bridges on the substrate for connecting the plurality of lateral touch driving lines. The plurality of lateral touch driving lines can transmit signals through the conductive bridges. In this embodiment of the present invention, the touch panel may be formed by five patterning processes (also known as five masks) or six patterning processes (also known as six masks). In the case where the touch panel is to formed by five patterning processes, the conductive bridge is formed of a metal material; in the case where the touch panel is formed by six patterning processes, the conductive bridge is formed of an ITO material which is the same as the material for the transparent conductive pattern.

The top view of the substrate on which the conductive bridge and the transparent conductive layer are formed may be as shown in FIG. 1-1 or FIG. 1-2.

The distribution density of the padding blocks in the overlapping region is greater than the distribution density of the padding blocks in the view area. The plurality of touch driving lines laterally disposed and the plurality of touch sensing lines longitudinally disposed form a plurality of cross structures, and each cross structure and a plurality of padding blocks in the padding areas at four corners of the cross structure constitute a touch unit. The distribution density of the padding blocks in each first padding area located in the overlapping region is greater than the distribution density of the padding blocks in the second padding area in the view area, and the relative positions of the first padding area and the second padding area in different touch units are the same.

In some embodiments, the gap width between any two adjacent pattern units in the overlapping region is greater than 30 μm.

In some embodiments, the gap width between any two adjacent pattern units in the overlapping region is 100 μm.

In some embodiments, the corners of any of the pattern units in the transparent conductive pattern are round corners.

In some embodiments, the transparent conductive pattern is an axisymmetric pattern, and has two mutually perpendicular symmetric axes.

The specific explanation of the manufacturing method for a touch panel in the embodiment of the present invention may refer to the corresponding description for the product embodiments described above, which will not be described in detail in the embodiment of the present invention.

In conclusion, with the manufacturing method of a touch panel provided by the embodiment of the present invention, the distribution density of the padding blocks in the overlapping region in the transparent conductive pattern is greater than the distribution density of the padding blocks in the view area. Since the distribution density of the padding blocks in the overlapping region is greater, that is, the number of padding blocks in the overlapping region per unit area is larger, the area of each padding block in the overlapping region is relatively small. In the case where the touch driving line or the touch sensing line is short-circuited with the padding block, the impact on the capacitance between the touch driving line and the touch sensing line is small due to the small area of the padding block in the black matrix area, thereby effectively reducing the influence on the touch effect of the touch panel.

A further embodiment of the present invention provides a touch device comprising the touch panel provided by any of the preceding embodiments of the present invention. The touch device provided by the embodiment of the present invention may be any product or component having a touch display function such as a mobile phone, a tablet computer, a television set, a display, a notebook computer, a digital photo frame, a navigator, or the like.

Figure 18:
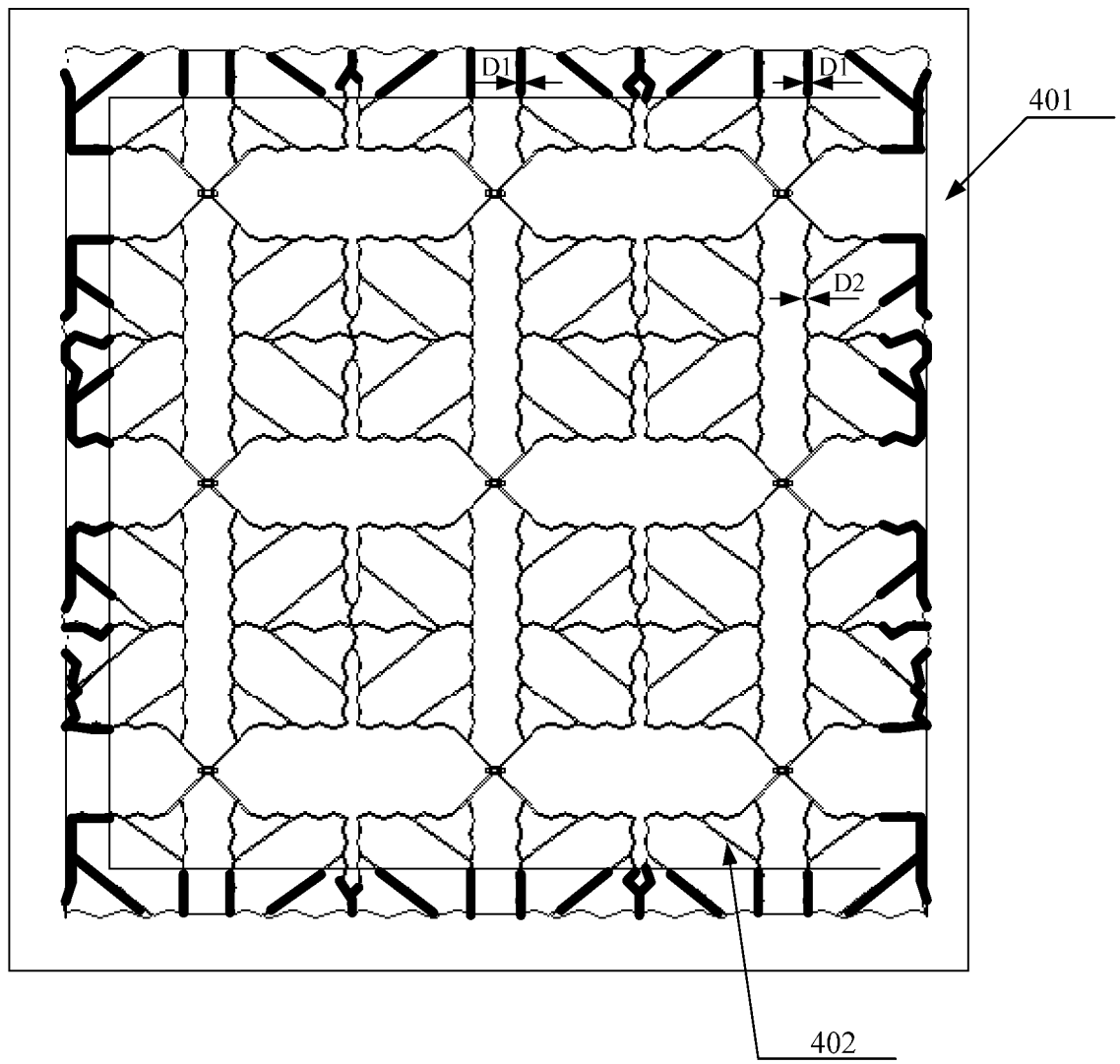
FIG. 18 is a schematic view of a touch panel according to another embodiment of the present invention.

Yet another embodiment of the present invention further provides a touch panel 40. As shown in FIG. 18, the touch panel comprises a substrate (not shown in FIG. 18); a black matrix 401 on the substrate, the black matrix being located in the annular area at edges of the substrate; a transparent conductive pattern 43 on the substrate on which the black matrix is formed. There is an overlapping region between the transparent conductive pattern and the black matrix in the annular area. The transparent conductive pattern comprises a plurality of touch driving lines laterally disposed and a plurality of touch sensing lines longitudinally disposed, and a plurality of padding blocks. The plurality of touch driving lines laterally disposed and the plurality of touch sensing lines longitudinally disposed are insulated from each other. Each padding block forms an independent pattern unit in the transparent conductive pattern. The gap width between any two adjacent pattern units in the overlapping region is greater than 30 μm.

In some embodiments, the gap width between any two adjacent pattern units in the overlapping region is 100 μm.

In the conventional touch panel 20, as shown in FIG. 13, in order to improve the optical effect of the view area, the gap width between adjacent pattern units in the view area is usually 30 μm (microns). In order to ensure the uniformity of the integral structure of the touch panel, the gap width between all the pattern units on the transparent conductive pattern is set as a fixed width, i.e. 30 μm.

However, the inventors have confirmed, after a lot of experiments, that the larger the gap width between two adjacent pattern units in the overlapping region between the transparent conductive pattern and the black matrix is, the lower the probability of short-circuiting is. Therefore, in an embodiment of the present invention, the gap width between any two adjacent pattern units located in the overlapping region may be greater than 30 μm. This will effectively reduce the probability of short-circuiting in the overlapping region.

However, when the gap width between the pattern units in the black matrix area increases, the node capacitance of a single touch unit increases. When the gap width is too large (for example, greater than 100 μm), the node capacitance increases too much. As a result, the node capacitance for the black matrix area is generally much larger than the node capacitance for the view area, resulting in poor uniformity of the transparent conductive pattern, and affecting the touch performance of the edge area of the touch panel. The upper limit of the gap width that can be supported by a driving integrated circuit (IC) chip respectively connected to the touch driving line and the touch sensing line is usually 100 μm (that is, when the gap width is 100 μm or less, the node capacitance is within the acceptable range for the driving IC chip, and the impact on the touch performance of the edge area of the touch panel is not significant at that time). In order to ensure the effective driving by the driving IC chip, in some embodiments, as shown in FIG. 18, in the touch panel 10 provided by an embodiment of the present invention, the gap width D1 between any two adjacent pattern units in the overlapping region is 100 μm. The gap width D2 in the view area can still be 30 μm.

In conclusion, the touch panel provided by the embodiment of the present invention can effectively reduce the probability of short-circuiting in the overlapping region since the gap width between any two adjacent pattern units in the overlapping region is greater than 30 μm. Moreover, when the gap width between any two adjacent pattern units is 100 μm, the probability of short-circuiting in the overlapping region can be minimized while ensuring the effective driving by the driving IC chip.

It is to be noted that the term "adjacent" as described in the embodiments of the present invention means that the two pattern units are insulated by a gap, but are close to each other.

The foregoing embodiments are merely some embodiments of the present invention and are not intended to limit the present invention. Any modification, equivalent substitution, improvement, and the like made within the spirit and principle of the invention shall be encompassed within the range of the invention.

The invention claimed is:

1. A touch panel comprising:
   a substrate;
   a black matrix, the black matrix being located in an annular area at edges of the substrate; and
   a transparent conductive pattern, the transparent conductive pattern having an overlapping region with the black matrix in the annular area, the transparent conductive pattern comprising a plurality of lateral touch driving lines and a plurality of longitudinal touch sensing lines,
   wherein the touch driving lines and the touch sensing lines are insulated from each other,
   wherein the plurality of lateral touch driving lines and the plurality of longitudinal touch sensing lines form a plurality of cross structures, each cross structure creates four padding areas that are located at four corners of the cross structure, respectively,
   wherein the transparent conductive pattern further comprises a plurality of padding blocks at each padding area of the padding areas, the plurality of padding blocks are independent of each other so that each padding block forms an independent pattern unit in the transparent conductive pattern, wherein each cross structure and the padding blocks located within the padding areas at four corners of the cross structure constitute a touch unit, wherein the transparent conductive pattern further comprises a wing line which is a slave touch line extending from a first master touch line in a direction different from that in which the first master touch line is arranged, the first master touch line being one of the plurality of touch driving lines and the plurality of touch sensing lines, the plurality of padding blocks comprise a second padding block in the overlapping region adjacent to both the first master touch line and the wing line, and a third padding block in the overlapping region not adjacent to the first master touch line but adjacent to the wing line, wherein a gap surrounding the second padding block includes gaps between the second padding block and, the first master touch line and the wing line, and a third gap and a fourth gap between the second padding block and adjacent padding blocks;

a gap surrounding the third padding block includes a gap between the third padding block and the wing line and a fifth gap between the third padding block and an adjacent padding block;

wherein the third gap extends in a direction parallel to a direction in which the first master touch line is arranged, the third gap extends from the wing line a second distance into an inner boundary of the black matrix, the fourth gap extends in a direction parallel to the inner boundary of the black matrix, the fifth gap extends in a direction parallel to a direction in which the wing line is arranged, the second distance being equal to a gap width between pattern units in a view area.

2. The touch panel according to claim 1, wherein a distribution density of padding blocks in each padding area in the overlapping region is greater than a distribution density of padding blocks located in the view area.

3. The touch panel according to claim 1, wherein a gap width between any two adjacent pattern units in the overlapping region is greater than 30 μm.

4. The touch panel according to claim 3, wherein the gap width between any two adjacent pattern units in the overlapping region is 100 μm.

5. The touch panel according to claim 1, wherein corners of any of the pattern units in the transparent conductive pattern are round corners.

6. The touch panel according to claim 1, wherein areas of the padding blocks in the overlapping region decrease sequentially from a padding block away from the first master touch line to a padding block close to the first master touch line.

7. The touch panel according to claim 1, wherein the transparent conductive pattern is an axisymmetric pattern, and has two mutually perpendicular symmetric axes.

8. The touch panel according to claim 1,
wherein areas of the padding blocks in the overlapping region decrease sequentially from a padding block away from the wing line to a padding block close to the wing line.

9. The touch panel according to claim 1, wherein the plurality of padding blocks comprise a first padding block in the overlapping region adjacent to a second master touch line, the second master touch line being one of the plurality of touch driving lines and the plurality of touch sensing lines, wherein a gap surrounding the first padding block includes a gap between the first padding block and the second master touch line, and a first gap and a second gap between the first padding block and adjacent padding blocks;

wherein the first gap extends in a direction parallel to a direction in which the second master touch line is arranged, the first gap extends from a boundary of the transparent conductive pattern a first distance into the inner boundary of the black matrix, the second gap extends in a direction parallel to the inner boundary of the black matrix, the first distance being equal to a gap width between pattern units in the view area.

10. A touch device comprising the touch panel according to claim 1.

11. The touch device according to claim 10, wherein a distribution density of padding blocks in each padding area in the overlapping region is greater than a distribution density of padding blocks located in the view area.

12. The touch device according to claim 10, wherein a gap width between any two adjacent pattern units in the overlapping region is greater than 30 μm.

13. The touch device according to claim 12, wherein the gap width between any two adjacent pattern units in the overlapping region is 100 μm.

14. The touch device according to claim 10, wherein corners of any of the pattern units in the transparent conductive pattern are round corners.

15. The touch device according to claim 10, wherein areas of the padding blocks in the overlapping region decrease sequentially from a padding block away from the first master touch line to a padding block close to the first master touch line.

16. The touch device according to claim 10, wherein the transparent conductive pattern is an axisymmetric pattern, and has two mutually perpendicular symmetric axes.

17. The touch device according to claim 10,
wherein areas of the padding blocks in the overlapping region decrease sequentially from a padding block away from the wing line to a padding block close to the wing line.

18. The touch panel according to claim 1, wherein a gap width between any two adjacent pattern units in the overlapping region is greater than 30 μm.

19. The touch panel according to claim 18, wherein the gap width between any two adjacent pattern units in the overlapping region is 100 μm.

\* \* \* \* \*